(12) United States Patent
Jonsson et al.

(10) Patent No.: US 7,738,535 B2
(45) Date of Patent: Jun. 15, 2010

(54) METHOD AND APPARATUS FOR REMOVING PILOT CHANNEL AMPLITUDE DEPENDENCIES FROM RAKE RECEIVER OUTPUT

(75) Inventors: Elias Jonsson, Malmö (SE); Andreas Cedergren, Bjárred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 600 days.

(21) Appl. No.: 11/752,014

(22) Filed: May 22, 2007

(65) Prior Publication Data
US 2008/0291981 A1  Nov. 27, 2008

(51) Int. Cl.
*H04B 1/00* (2006.01)
(52) U.S. Cl. ..................................... 375/148
(58) Field of Classification Search .............. 375/142, 375/144, 148, 150; 370/320, 335, 342, 441
See application file for complete search history.

(56) References Cited

U.S. PATENT DOCUMENTS

| | | | |
|---|---|---|---|
| 2003/0156563 A1 | 8/2003 | Papasakellariou et al. | |
| 2003/0179733 A1* | 9/2003 | Yano | ........................... 370/335 |
| 2004/0033791 A1 | 2/2004 | Schmidl et al. | |
| 2004/0179583 A1 | 9/2004 | Jeong | |
| 2005/0025225 A1 | 2/2005 | Niederholz et al. | |
| 2005/0195886 A1 | 9/2005 | Lampinen et al. | |
| 2006/0103587 A1 | 5/2006 | Cedergren et al. | |
| 2006/0199544 A1* | 9/2006 | Ramakrishna et al. | ... 455/67.11 |
| 2006/0269006 A1 | 11/2006 | Kuroda | |
| 2007/0072552 A1 | 3/2007 | Jonsson et al. | |
| 2007/0195900 A1* | 8/2007 | Lee et al. | ..................... 375/260 |

FOREIGN PATENT DOCUMENTS

| | | |
|---|---|---|
| EP | 1672807 | 6/2006 |
| GB | 2401004 | 10/2004 |
| WO | 2004/056100 | 7/2004 |
| WO | 2006/089785 | 8/2006 |
| WO | 2006/101620 | 9/2006 |

OTHER PUBLICATIONS

Iglesias, Marta. "HSDPA Introduces New Level of Complexity to 3G." Available at http://wireless.iop.org/articles/feature/6/6/5, 2007.

* cited by examiner

*Primary Examiner*—Don N Vo
(74) *Attorney, Agent, or Firm*—Coats & Bennett, P.L.L.C.

(57) ABSTRACT

A receiver utilizes pilot channel propagation channel estimates and a signal-to-interference metric derived from the pilot channel to form combining weights for use in obtaining soft symbols from a desired channel for subsequent decoding. The soft symbols thus obtained are substantially independent of the pilot channel amplitude.

16 Claims, 5 Drawing Sheets

METHOD AND APPARATUS FOR REMOVING PILOT CHANNEL AMPLITUDE DEPENDENCIES FROM RAKE RECEIVER OUTPUT

BACKGROUND

1. Technical Field

The present invention generally relates to methods and apparatus for processing received wireless communication signals, and particularly relates to generating soft symbols from a traffic channel signal using combining weights derived from pilot channel propagation channel estimates, such that the resulting soft symbols do not vary with changes in the pilot-channel-to-traffic-channel amplitude ratio.

2. Background

In wireless communication systems, a base station typically transmits several physical channels. Physical channels may be separated in a variety of ways, including by frequency, time, or code, or by some combination of these. In Wideband Code Division Multiple Access (WCDMA) systems defined by the $3^{rd}$ Generation Partnership Project (3GPP), numerous physical channels are employed. For example, some of the channels defined for the downlink (base-station-to-mobile transmissions) include the downlink dedicated physical channel (DPCH) for carrying user-specific data traffic, and the common pilot channel (CPICH), which is used by mobile stations to derive information about other channels (such as the DPCH) transmitted by a base station. 3GPP has also defined a High-Speed Physical Downlink Shared Channel (HS-PDSCH), which may carry data traffic targeted to several mobile stations.

A received signal differs from the transmitted signal in various ways due to the effects of the signal passing through the propagation channel, which includes the transmission medium (e.g. the air) as well as the analog components of the transmitting and receiving equipment. In wireless systems in particular, such effects on the radio-frequency signal include multipath fading, interference from other signals passing through the medium, and thermal noise. The signal received at the receiver can therefore be thought of as a composite signal consisting of a desired component and one or more impairment components representing distortion caused by the propagation channel, e.g., interference and noise.

Pilot symbols are often transmitted among information symbols on physical channels. These pilot symbols are used in mobile receivers for synchronization purposes and to derive information about the propagation environment experienced by the signals transmitted by the base station and received by the mobile receivers. This latter information may include propagation channel estimates, which model the effects of the propagation channel. These channel estimates are used by the receiver to reverse the effects of the channel and to reconstruct the transmitted symbols. Generally speaking, the more accurately the propagation channel is modeled in the receiver, then the more accurately the transmitted symbols can be reconstructed and decoded.

Channel estimation is well known in the art and is discussed, for example, in "Digital Communications" 4th Edition, by John G. Proakis, McGraw-Hill, 2000. In general, channel estimators compare received signal samples to "known" symbols to produce estimates of the channel response. These known symbols, or pilot symbols, may be derived from a physical channel specifically designated for carrying pilot symbols. For example, 3GPP has defined a common pilot channel (CPICH) which may be used by the mobile terminal as a source of pilot symbols for channel estimation. In general, pilot symbols may be transmitted on channels specifically designed to carry pilot symbols, or may be interleaved among information bits on a channel primarily intended for carrying data traffic. Although pilot symbols may be used for various purposes, the term "pilot symbol" as used herein refers to symbols used for channel estimation purposes, and "pilot channel" refers to a physical channel that carries pilot symbols.

In WCDMA systems, the CPICH is commonly used to provide a phase reference for the demodulation process, since the received CPICH signal is often stronger than other received signals and accurate channel estimates may be obtained from it. In some cases, propagation channel estimates derived from received CPICH symbols may be very useful in reconstructing and demodulating other symbols. For example, because the DPCH and the CPICH may be transmitted using much of the same radio frequency equipment at the base station, and from the same antenna, the two channels may experience essentially the same propagation response. In other words, the two channels will experience similar delays and phase changes, and will undergo similar multipath responses. Thus, it is recognized that channel estimates based on the received CPICH signals may be useful for estimating the channel response experienced by the DPCH signals.

However, the power of the CPICH will in many cases be much higher than the power of a traffic channel, such as the DPCH, transmitted by the same base station. Furthermore, the transmission powers for the traffic channel and the CPICH will in some cases differ by an amount unknown to the mobile, and may differ by amounts that vary over time. If pilot symbols are also available on the traffic channel, then the amplitude of the traffic channel response can be estimated by a channel estimator, and compared to the estimated pilot channel response to determine a ratio between the pilot channel amplitude and the traffic channel amplitude. In this case, pilot channel estimates may be scaled by this ratio to obtain estimates of the traffic channel response. Because the amplitude difference is accounted for, the resulting traffic channel estimates are largely independent of the pilot channel amplitude. This approach is described by U.S. Patent Application Publication 2007/0072552 A1.

However, other channels, such as the HS-PDSCH, may not carry pilot symbols from which the traffic channel amplitude can be easily estimated. In this case, the above technique is not practical.

SUMMARY

Methods and apparatus for processing received communication signals are disclosed, wherein propagation channel coefficients are estimated using pilot channel symbols; a signal-to-interference metric for the pilot channel is formed; combining weights are determined as a function of the propagation channel estimates, such that the combining weights are inversely proportional to the signal-to-interference metric; the combining weights are used to scale samples of a received sample to produce weighted samples; and the weighted samples are combined to form soft symbols corresponding to a desired traffic channel for decoding.

In this manner, pilot symbols from a pilot channel may be used to estimate the propagation channel response for a traffic channel and to determine combining weights for use in a RAKE receiver to produce soft symbols estimating symbols of the traffic channel. The obtained soft symbols are substantially independent of the transmitted amplitude of the pilot channel.

In one embodiment, a RAKE receiver is configured to generate the combining weights as a function of propagation channel coefficients estimated from pilot symbols of a pilot channel, and further as a function of a covariance matrix representing correlations of signal impairments observed at fingers of the RAKE receiver, wherein the combining weights are inversely proportional to the square root of a signal-to-interference metric derived from the pilot symbols. The combining weights are used to scale samples of a received signal to obtain scaled samples; the scaled samples are combined to obtain soft symbols from a desired channel for decoding. Summing the samples scaled with combining weights derived in this manner removes variation in the soft symbols caused by variations in the received pilot-channel-to-traffic-channel amplitude ratio.

DETAILED DESCRIPTION

Figure 1:
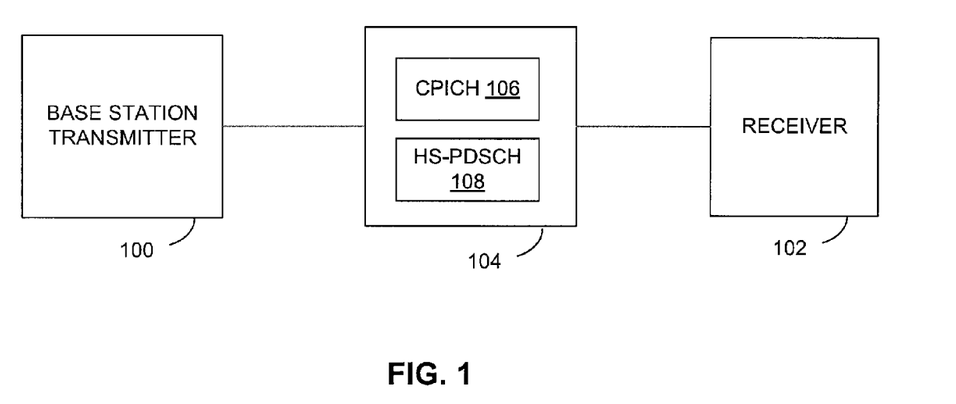
FIG. 1 is a block diagram of a digital communications system.

FIG. 1 illustrates a block diagram of a typical wireless digital communications system, comprising a base station 100 of a cellular radio frequency (RF) communications system, and a receiver 102, which may be part of a mobile terminal. In the illustrated system, the base station 100 communicates to the receiver 102 via communications signals transmitted over an air interface. Of course, in most communications system some or all of the communications devices are both transmitting and receiving communications devices. For the purposes of the following description, the base station 100 is considered to comprise a transmitter unit that applies the necessary modulation to the signal so that it can be transmitted over an air interface to the receiver 102. The receiver 102 implements a demodulation process corresponding to the modulation process implemented by the base station 100, thereby allowing the receiver to recover the originally transmitted information from the received signal.

In particular, in accordance with one or more embodiments of the present invention, receiver 102 estimates propagation channel coefficients using symbols received from a pilot channel; forms a signal-to-interference metric for the pilot channel; generates combining weights as a function of the propagation channel coefficients, such that the combining weights are inversely proportional to the signal-to-interference metric; and scales samples of the received signal to obtain weighted samples. The weighted samples are combined to yield soft symbols that may be decoded. The soft symbols generated by the foregoing approach are substantially independent of the amplitude of the pilot channel response, thus simplifying subsequent decoding. The detailed operation of the receiver will be discussed further below.

Base station 100 communicates with receiver 102 over a transmission channel 104. Two physical channels, a common pilot channel, or CPICH 106, and a High-Speed Physical Downlink Shared Channel, or HS-PDSCH 108, are transmitted over the transmission channel 104. The transmission channel 104 represents the physical medium over which the physical channels are carried. In general, the physical channels correspond to modulated radio signals and may be separated by spreading codes and/or time-multiplexing. Depending on the configuration of the base station, multiple physical channels may, however, be transmitted through the same medium, using the same or similar transmission frequencies. Thus, the CPICH 106 and HS-PDSCH 108 may in practice be transmitted through an essentially identical transmission channel, and in particular may experience nearly identical multipath propagation.

The receiver 102 simultaneously receives the signals from the CPICH and HS-PDSCH channels 106 and 108, respectively, using, for example, different fingers of a RAKE receiver. The CPICH is broadcast within each cell of a cellular telecommunications network using a specific spreading code and without power control, at a power level selected so that even mobile stations outside the intended cell boundary can receive it. Thus, the power of the transmitted CPICH signal will in many cases be much higher than the power of an HS-PDSCH signal transmitted from the same base station. Furthermore, the transmission powers on the HS-PDSCH and the CPICH will in most cases differ by an amount unknown to the mobile, and may differ by amounts that vary over time.

The HS-PDSCH 108 and the CPICH 106 are typically transmitted using much of the same radio frequency equipment at the base station, and from the same antenna. Accordingly, the two channels will experience essentially the same propagation response. Accordingly, channel estimates based on the received CPICH signals are useful for estimating the channel response experienced by the HS-PDSCH signals.

Figure 2:
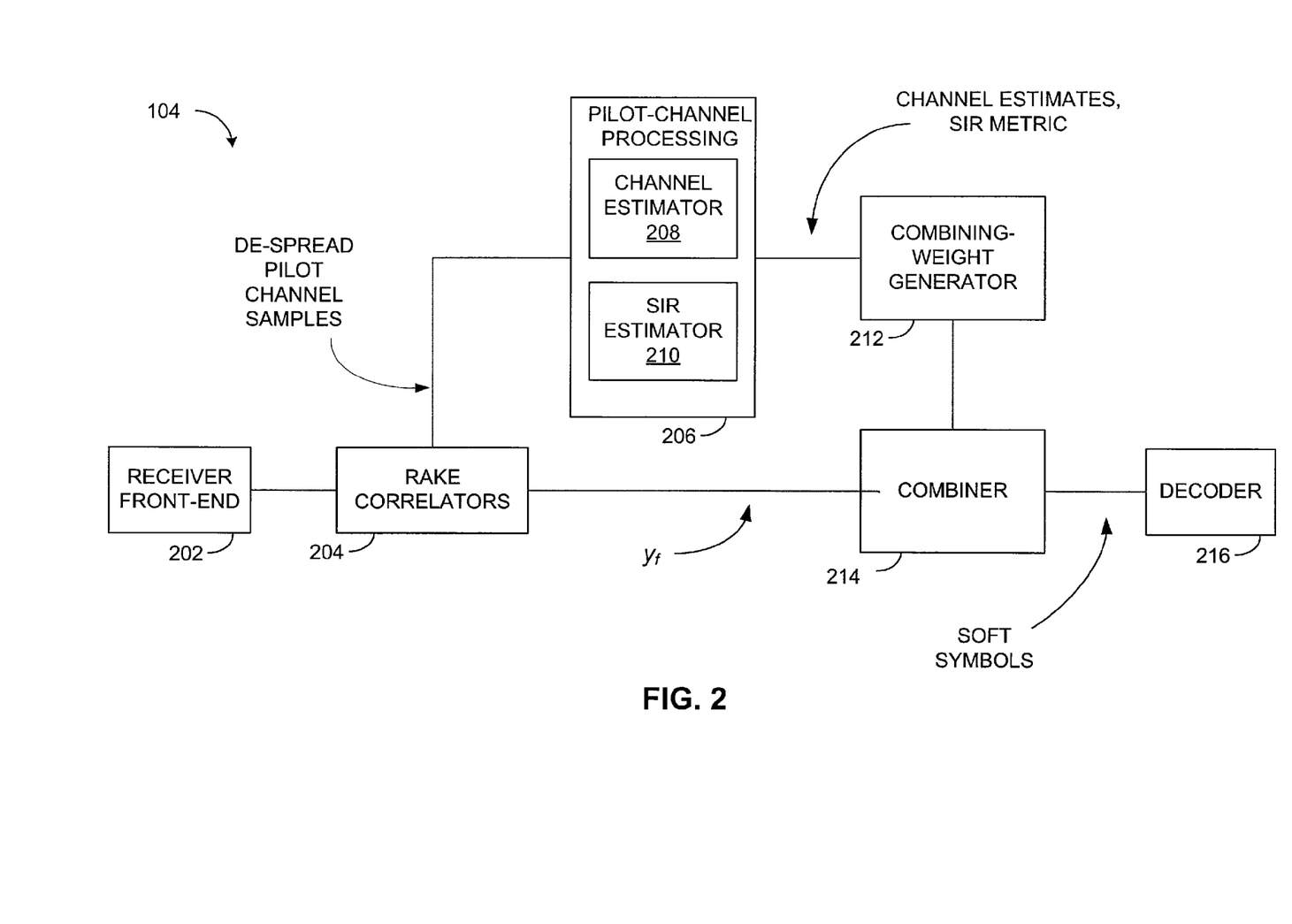
FIG. 2 is a block diagram illustrating functional blocks of a receiver configured to obtain soft symbols for decoding.

FIG. 2 illustrates an exemplary receiver for processing received signals in accordance with one embodiment of the present invention. Receiver 102 comprises a receiver front-end 202, which includes radio-frequency and analog circuits. Processing in the receiver front-end 202 may include filtering, amplification, mixing down to baseband using in-phase and quadrature local oscillators, analog-to-digital (A/D) conversion, and synchronization, resulting in a stream of digital samples of the received signal. These samples may be further processed to reconstruct the symbols of the desired channel, e.g. the HS-PDSCH 108.

Receiver 102 also includes baseband signal processing of the received sample stream to recover (or "detect") the information symbols of the desired physical channel according to the modulation applied at the base station 100. In the exemplary receiver 102 of FIG. 2, this baseband signal processing is based on using a model of the transmission medium, i.e. a modeled channel response, to generate combining weights for combining despread outputs from RAKE receiver fingers.

In the receiver of FIG. 2, an array of RAKE correlator "fingers" 204 are used to obtain time-delayed versions of the received signal. The time delays may be selected to correspond to the delays experienced by the received multipath rays. Because each RAKE finger correlates a delayed version of the received signal against the spreading code used to create the transmitted signal, the outputs of RAKE correlators 204 are time-delayed, "despread" samples of the received signal. Baseband processing in receiver 102 also comprises a pilot-channel processing block 206, a combining-weight generator 212, combiner 214, and decoder 216.

In the receiver 102 of FIG. 2, signals $y_f$ are output from RAKE correlators 204, and correspond to a desired channel such as the HS-PDSCH. These signals may be represented as $y_f = h_f^{Data} s + n_f$, where $h_f^{Data}$ is the propagation channel response related to the transmitted traffic channel for finger/ time-delay f, s is the original transmitted symbol, and $n_f$ is the thermal noise and interference at finger/time delay f. Finger outputs $y_f$ are combined in combiner circuit 214 to produce a soft symbol, including a noise component, represented by $\tilde{s}+\tilde{n}$. Combining weights are provided by combining-weight generator 212, using pilot channel estimates and a signal-to-interference (SIR) metric produced by pilot-channel processing block 206.

In the pilot-channel processing block 206, pilot channel propagation channel estimates $h_{est,f}^{CPICH}$ are computed for each finger/time-delay f. That is, for each RAKE finger in RAKE correlators 204 allocated to the desired signal, a corresponding channel estimate is computed for pilot channel signals by the channel estimator 208, using pilot symbols. Even though these estimates are for the pilot channel, not the traffic channel, the estimates are nevertheless useful for generating combining weights for reconstructing the unknown traffic channel symbols.

The pilot channel propagation channel estimates $h_{est,f}^{CPICH}$ may be used to generate combining weights $w_f = (h_{est,f}^{CPICH}/I_f)^*$, where $I_f$ is an estimate of noise-plus-interference power as related to the pilot channel (CPICH) for finger/time delay f, and $(\ )^*$ denotes the complex-conjugate operation. In this case, the output of the combiner 214, which scales the finger outputs $y_f$ with the combining weights $w_f$ and sums, will be:

$$\sum_{f=1}^{F} w_f \cdot y_f = \sum_{f=1}^{F} y_f \left(\frac{h_{est,f}^{CPICH}}{I_f}\right)^* \qquad \text{Eq. (1)}$$

$$= s \sum_{f=1}^{F} h_f^{Data} \left(\frac{h_{est,f}^{CPICH}}{I_f}\right)^* + \sum_{f=1}^{F} n_f \left(\frac{h_{est,f}^{CPICH}}{I_f}\right)^*$$

$$= \tilde{s} + \tilde{n}.$$

In the decoder 216, the soft symbols produced by combiner 214 are processed and decoded according to the modulation applied for the traffic channel at base station 100. For example, soft bit values for QPSK modulation may be generated by taking the real and imaginary part of the output $\tilde{s}+\tilde{n}$. These soft bit values are then quantized and processed further for decoding.

For optimal decoding, the soft symbol values $\tilde{s}$ should preferably be independent of the pilot channel amplitude. However, examination of Eq. (1) indicates that this is not so if the combining weights are $(h_{est,f}^{CPICH}/I_f)^*$. Rather, $$\tilde{s} = s \sum_{f=1}^{F} h_f^{Data} \left(\frac{h_{est,f}^{CPICH}}{I_f}\right)^*. \qquad \text{Eq. (2)}$$

Thus, the soft symbols are a function of both the pilot channel response amplitude as well as the traffic channel response amplitude. As a result, the soft symbol values will vary both as a function of the pilot channel propagation channel loss, which should be similar to the propagation channel loss for the traffic channel, and as a function of transmitted pilot channel amplitude, which may differ from the transmitted traffic channel amplitude.

Assume the propagation channel responses for the traffic and pilot channels are such that $h_f^{CPICH} = q \cdot h_f^{Data}$ at a given symbol time, for some non-negative real number q. That is, q is the amplitude ratio between the transmitted traffic and pilot channels, at a given symbol time, and is generally unknown to the receiver. Thus, the estimated pilot channel response will vary depending on the transmitted pilot channel power.

If the channel estimator 208 provides accurate estimates of the pilot channel response, then $h_{est,f}^{CPICH} \approx h_f^{CPICH}$, and $$h_{est,f}^{CPICH} \approx q \cdot h_f^{Data}. \qquad \text{Eq. (3)}$$

Substituting Eq. (3) into Eq. (2) yields:

$$\tilde{s} \approx s \sum_{f=1}^{F} h_f^{Data} \left(\frac{q \cdot h_{est,f}^{DATA}}{I_f}\right)^* = q \cdot s \sum_{f=1}^{F} \frac{|h_f^{Data}|^2}{I_f}. \qquad \text{Eq. (4)}$$

Hence, the estimated symbol is a function not only of the traffic channel propagation channel response $h_f^{Data}$, but also of the amplitude ratio q between the transmitted pilot channel and the transmitted traffic channel.

In receiver 102, it is preferable to remove the dependence of the estimated symbols on the pilot channel amplitude. One benefit from removing this dependence is a reduction in the dynamic range required in the symbol quantizers included in decoder block 216. The dependence of the estimated symbols on the pilot channel amplitude can be substantially eliminated if the combining-weight generator 212 provides combining weights of the form:

$$w_f = \frac{h_{est,f}^{CPICH}}{I_f} \cdot \frac{1}{\sqrt{SIR_{filt}^{CPICH}}}. \qquad \text{Eq. (5)}$$

These combining weights differ from those used in Eq. (1) by the factor $$\frac{1}{\sqrt{SIR_{filt}^{CPICH}}}.$$

Here, $SIR_{filt}^{CPICH}$ is a filtered signal-to-interference ratio (SIR) value for the pilot channel CPICH. That is, the noise-plus-interference power $I_f$ is estimated for the pilot channel for each finger/time-delay f, and a signal-to-interference metric $$\sum_{f=1}^{F} \frac{|h_{est,f}^{CPICH}|^2}{I_f}$$

is calculated. This is done in the pilot channel processing block 206. Filtering of several successively determined SIR metrics may be performed, since the individual metrics may be noisy.

Using the pilot channel propagation channel estimates, and the SIR metrics, the combining-weight generator 212 of FIG. 2 produces the combining weights of Eq. (5). When these weights are used by combiner 214, the output of combiner 214 becomes:

$$\sum_{f=1}^{F} w_f \cdot y_f = \sum_{f=1}^{F} y_f \left( \frac{h_{est,f}^{CPICH}}{I_f \sqrt{SIR_{filt}^{CPICH}}} \right)^*$$

$$= s \sum_{f=1}^{F} h_f^{Data} \left( \frac{h_{est,f}^{CPICH}}{I_f \sqrt{SIR_{filt}^{CPICH}}} \right)^* + \sum_{f=1}^{F} n_f \left( \frac{h_{est,f}^{CPICH}}{I_f \sqrt{SIR_{filt}^{CPICH}}} \right)^*$$

$$= \tilde{s} + \tilde{n},$$

and the soft symbol estimate:

$$\tilde{s} = s \sum_{f=1}^{F} \frac{h_f^{Data}(h_{est,f}^{CPICH})^*}{I_f} \cdot \frac{1}{\sqrt{SIR_{filt}^{CPICH}}}. \quad \text{Eq. (6)}$$

Assuming there is no material fading during the filtering time period in which $SIR_{filt}^{CPICH}$ is determined, then $SIR_{filt}^{CPICH}$ is approximately constant, since the CPICH is transmitted with constant amplitude. Therefore, $SIR_{filt}^{CPICH}$ is approximately equal to $$\sum_{f=1}^{F} \frac{|h_f^{CPICH}|^2}{I_f},$$

where $h_f^{CPICH}$ is the actual propagation channel response for the pilot channel CPICH during the transmitted symbol s. Recalling that $h_f^{CPICH} = q \cdot h_f^{Data}$, then:

$$SIR_{filt}^{CPICH} \approx q^2 \sum_{f=1}^{F} \frac{|h_f^{Data}|^2}{I_f} = q^2 \cdot SIR^{Data}. \quad \text{Eq. (7)}$$

Substituting Eq. (7) into Eq. (6) yields:

$$\tilde{s} = s \sum_{f=1}^{F} \frac{h_f^{Data}(h_{est,f}^{CPICH})^*}{I_f} \cdot \frac{1}{\sqrt{SIR_{filt}^{CPICH}}}$$

$$\approx s \sum_{f=1}^{F} \frac{|h_f^{Data}|^2}{I_f} \cdot \frac{q}{q} \cdot \frac{1}{\sqrt{SIR^{Data}}}$$

$$= s \sqrt{SIR^{Data}}.$$

Hence, the estimated symbol $\tilde{s}$ is no longer a function of the pilot channel amplitude, but is approximately equal to the original symbol scaled by a signal-to-interference term relating to the traffic channel. Dependence of the estimated symbol $\tilde{s}$ upon the pilot channel amplitude has substantially been removed; any residual dependence is a function of inaccuracies in the channel estimation process and of the approximations discussed above.

A theoretically correct scaling of the soft symbols would make them proportional to $SIR^{Data}$ while in the above analysis they are proportional to $\sqrt{SIR^{Data}}$. However, simulations show that this does not matter; removing the dependency upon the pilot channel amplitude is more important.

Figure 3:
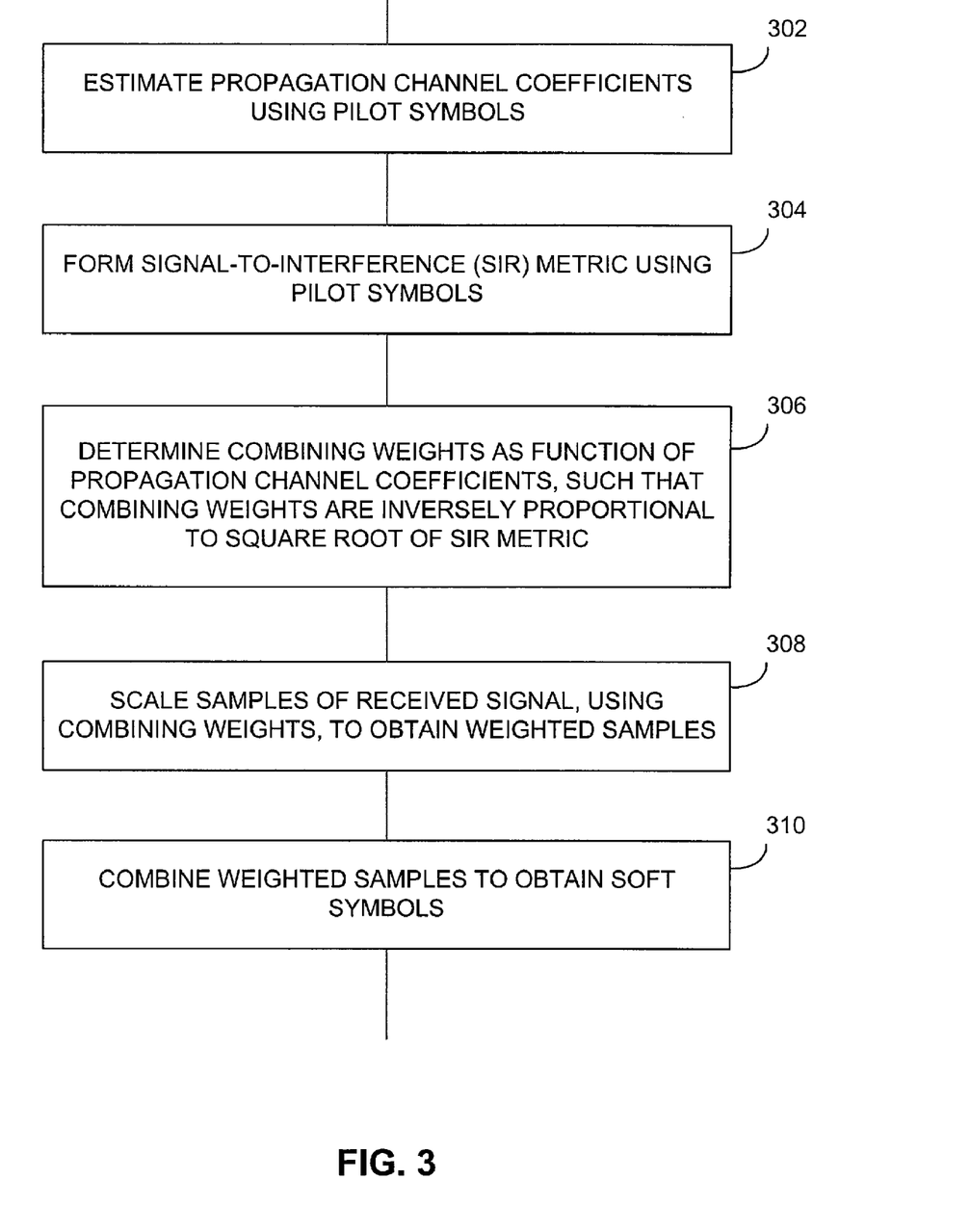
FIG. 3 shows a flow diagram of an embodiment of a method for processing a received signal.

FIG. 3 is a flow diagram for a method employed by an exemplary receiver 102. Block 302 illustrates the estimation of propagation channel coefficients using symbols received from a pilot channel. This estimation is performed in the channel estimator 208 of FIG. 2. As explained above, these propagation channel coefficients correspond to the channel response experienced by the pilot channel, e.g. the CPICH 106, but also correspond closely to the channel response experienced by an associated traffic channel, e.g. the HS-PDSCH 108.

Block 304 of FIG. 3 illustrates the forming of a signal-to-interference metric for the pilot channel, again using symbols received from the pilot channel. The SIR metric may be formed in an SIR estimator 210, as illustrated in FIG. 2, and is derived as a function of the estimated pilot channel response and estimated noise-plus-interference power observed on the pilot channel.

Block 306 illustrates the determination of combining weights. These combining weights are a function of the pilot channel propagation estimates of block 302, and are inversely proportional to the square root of the SIR metric of block 304. The combining weights may be formed by the combining-weight generator 212 of FIG. 2, in accordance with Eq. (5) above. However, those skilled in the art will recognize that additional scaling of the combining weights may be advantageous in any given receiver implementation, in order to better match the range of the combiner 214 output to the dynamic range of the decoder 216.

Block 308 depicts the scaling of received signal samples using the combining weights. In the receiver 102 of FIG. 2, the received signal samples correspond to the outputs of the RAKE fingers 204, $y_f$. Scaling is performed in the combiner 214 and produces weighted samples. After scaling, the combiner 214 combines the weighted samples to obtain a soft symbol from the desired channel for decoding, as illustrated by block 310. This soft symbol, as demonstrated above, is substantially independent of the pilot channel transmit amplitude.

Figure 4:
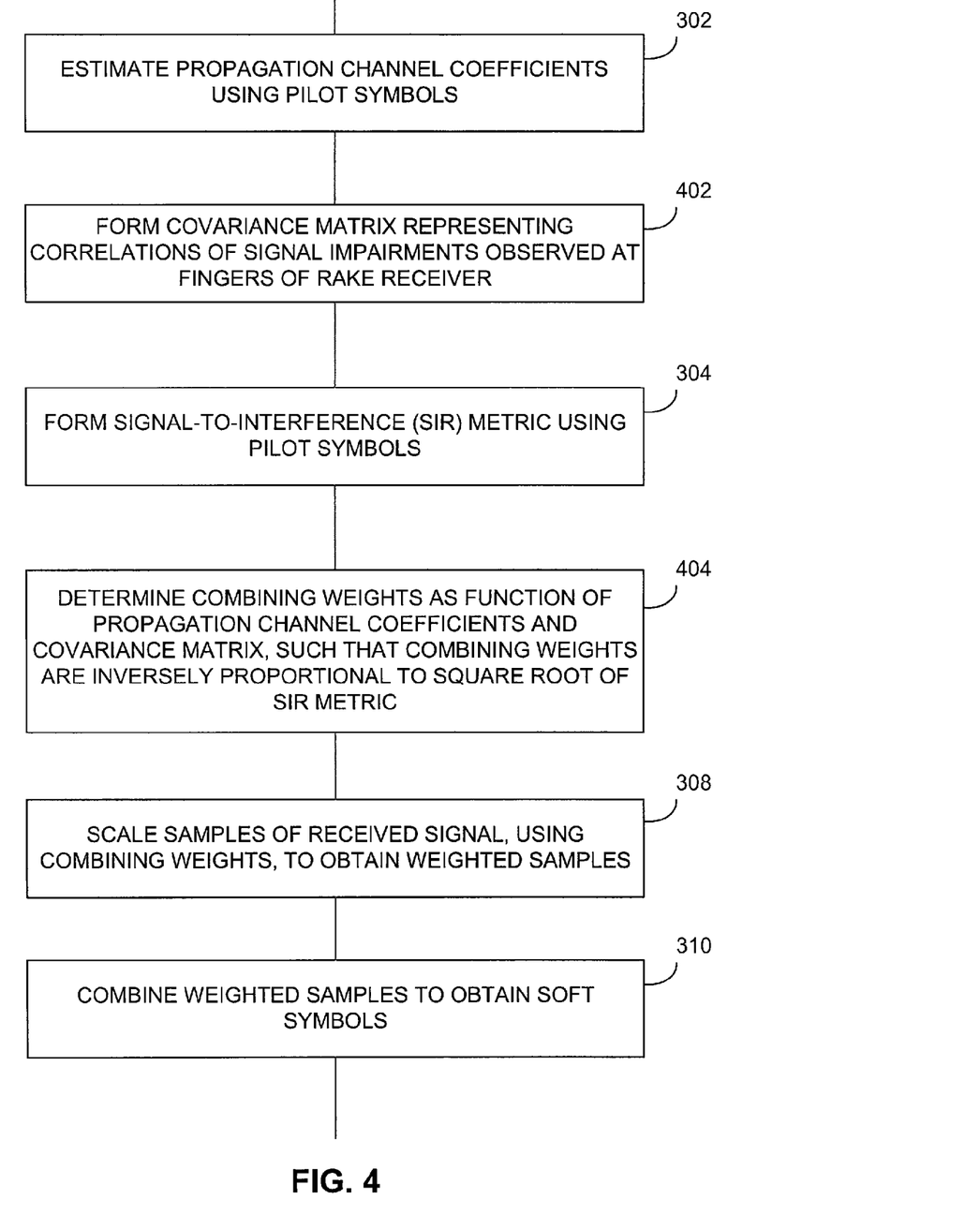
FIG. 4 illustrates a flow diagram of another embodiment of a method for processing a received signal.

The methods and apparatus discussed above are also applicable to a RAKE receiver employing interference cancellation. If interference cancellation is employed, then the combining weights $$\frac{h_{est,f}^{CPICH}}{I_f} \cdot \frac{1}{\sqrt{SIR_{filt}^{CPICH}}}$$

are replaced by $$\frac{R^{-1} h_{est}^{CPICH}}{\sqrt{SIR_{filt}^{CPICH}}}$$

where R is the covariance matrix of the interference and $h_{est}^{CPICH}$ is a column vector with entries $h_{est,f}^{CPICH}$. Estimation of the covariance matrix R may performed using any of a number of methods well known in the art, and is depicted in block 402 of the flow diagram of FIG. 4. The flow diagram illustrated by FIG. 4 is otherwise very similar to the flow diagram of FIG. 2, except that block 404 illustrates that the combining weights are determined as a function of the covariance matrix R, as well as the pilot channel propagation estimates $h_{est,f}^{CPICH}$. However, the combining weights are inversely proportional to the signal-to-interference metric, just as in the previous flow diagram.

Figure 5:
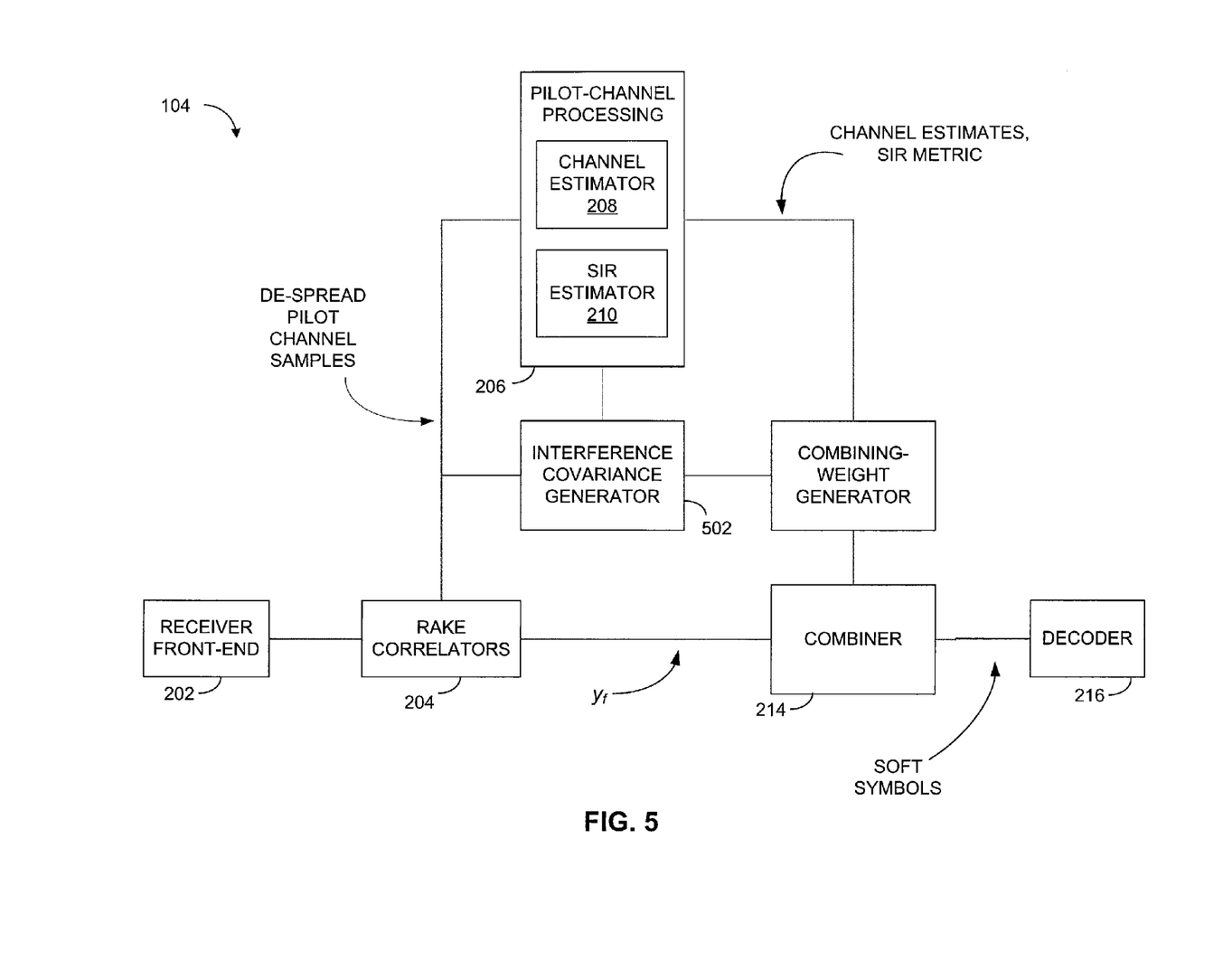
FIG. 5 is a block diagram illustrating functional blocks of another receiver configured to obtain soft symbols for decoding.

FIG. 5 depicts an interference-cancelling receiver in accordance with one or more embodiments of the present invention. Interference covariance generator 502 produces the covariance matrix R, which represents correlations of signal impairments caused by interfering signals, as observed at fingers of the RAKE correlators 204. The covariance matrix R is supplied to combining-weight generator 504, along with the pilot channel propagation estimates and the signal-to-interference metrics produced by the channel estimator 208 and the SIR estimator 210, respectively, of the pilot channel processing block 206. Combining-weight generator 504 produces combining weights $$\frac{R^{-1}h_{est}^{CPICH}}{\sqrt{SIR_{filt}^{CPICH}}}$$

for use by the combiner 214.

Using analysis similar to the above, the output of combiner 214, if the SIR term is omitted from the combining weights can be shown to be:

$$y^T \cdot (R^{-1}h_{est}^{CPICH})^* = s(h^{Data})^T \cdot (R^{-1}h_{est}^{CPICH})^* + n^T \cdot (R^{-1}h_{est}^{CPICH})^* = \tilde{s} + \tilde{n},$$

where super-script T denotes the transpose of a matrix, and the multiplications are vector multiplications. Again, $\tilde{s}$ depends on the pilot channel transmit amplitude.

This dependency can be removed by replacing the weighted channel estimates by $$R^{-1}h_{est}^{CPICH} \frac{1}{\sqrt{SIR_{filt}^{CPICH}}},$$

where $SIR_{filt}^{CPICH}$ is obtained by filtering successively determined SIR metrics $(h_{est}^{CPICH})^t \cdot (R^{-1}h_{est}^{CPICH})^*$.

In addition to the depicted functional blocks, the receivers illustrated in FIGS. 2 and 5 may include additional baseband processing circuits (not shown), providing functions such as supervising the previously discussed circuits, managing memory, interfacing with other operating circuitry, performing higher level communications functions, etc. As will be readily understood, receiver front-end circuits 202, RAKE correlators 204, channel estimator 208, SIR estimator 210, interference covariance generator 502, combining-weight generators 212 and 504, combiner 214, and decoder 216 may each be implemented using digital and/or analog hardware, microprocessors running software, or a combination. The circuits may comprise specialized or general-purpose processors, or digital signal processors (DSP), or one or more of each.

The receiver front-end 202 may comprise switches, filters, amplifiers, and other analog circuitry for conditioning the radio frequency signals received by one or more antennas (not shown), and may further comprise mixers, local oscillators, and analog-to-digital (A/D) converters, to supply a down-converted and digitized signal to RAKE correlators 204.

Receiver 102 may further be combined with transmitter circuitry to provide a complete transceiver device. This transceiver device may be configured as a portable, end-user terminal, such as a cellular radiotelephone, or as a fixed communications device.

With these and other variations and extensions in mind, those skilled in the art will appreciate that the foregoing description and the accompanying drawings represent non-limiting examples of the methods and apparatus taught herein for processing received signals to remove dependencies upon pilot channel transmit amplitude from estimated symbols from a desired traffic channel. As such, the present invention is not limited by the foregoing description and accompanying drawings. Instead, the present invention is limited only by the following claims and their legal equivalents.

What is claimed is:

1. A method for processing a received signal, comprising:
   estimating propagation channel coefficients using symbols received from a pilot channel;
   forming a signal-to-interference metric for said pilot channel using said symbols;
   determining combining weights as a function of the propagation channel coefficients and the signal-to-interference metric, wherein the combining weights are inversely proportional to the square root of the signal-to-interference metric;
   scaling samples of the received signal using the combining weights to obtain weighted samples; and
   combining the weighted samples to obtain soft symbols from a desired channel for decoding.

2. The method of claim 1, wherein the propagation channel coefficients correspond to fingers of a RAKE receiver, and wherein the signal-to-interference metric comprises a sum of signal-to-interference ratios for said fingers.

3. The method of claim 1, wherein determining combining weights comprises dividing the propagation channel coefficients by interference powers measured at fingers of a RAKE receiver and by the square root of the signal-to-interference metric.

4. The method of claim 3, wherein forming a signal-to-interference metric comprises forming successive signal-to-interference terms comprising sums of signal-to-interference ratios for said fingers, and filtering said successive signal-to-interference terms to obtain the signal-to-interference metric.

5. The method of claim 1, wherein determining combining weights as a function of the propagation channel coefficients further comprises determining the combining weights as a function of a covariance matrix representing correlations of signal impairments observed at fingers of a RAKE receiver.

6. The method of claim 5, wherein the symbols received from a pilot channel are pilot symbols received from a common pilot channel and the desired channel is a shared downlink channel.

7. The method of claim 5, wherein the pilot channel is a common pilot channel (CPICH) of a WCDMA system and the desired channel is a high-speed physical downlink shared channel (HS-PDSCH) of a WCDMA system.

8. The method of claim 5, wherein forming a signal-to-interference metric comprises forming successive signal-to-interference terms and filtering said successive signal-to-interference terms to obtain said signal-to-interference metric.

9. A receiver, comprising:
   a channel estimator configured to estimate propagation channel coefficients using symbols received from a pilot channel;
   an SIR estimator configured to generate a signal-to-interference metric for said pilot channel using said symbols;
   a combining-weight generator configured to generate combining weights as a function of the propagation channel coefficients and the signal-to-interference metric, wherein the combining weights are inversely proportional to the square root of the signal-to-interference metric; and a combiner configured to scale samples of a received signal using the combining weights and to combine the scaled samples to obtain soft symbols from a desired channel for decoding.

10. The receiver of claim 9, wherein the propagation channel coefficients correspond to fingers of a RAKE receiver, and wherein the signal-to-interference metric comprises a sum of signal-to-interference ratios for said fingers.

11. The receiver of claim 9, wherein the combining-weight generator generates the combining weights by dividing the propagation channel coefficients by interference powers measured at fingers of a RAKE receiver and by the square root of the signal-to-interference metric.

12. The receiver of claim 11, wherein the SIR estimator is configured to form successive signal-to-interference terms comprising sums of signal-to-interference ratios for said fingers, and to filter said successive signal-to-interference terms to obtain the signal-to-interference metric.

13. The receiver of claim 9, wherein the combining-weight generator is further configured to generate the combining weights as a function of a covariance matrix representing correlations of signal impairments observed at fingers of a RAKE receiver.

14. The receiver of claim 13, wherein the symbols received from a pilot channel are pilot symbols received from a common pilot channel and the desired channel is a shared downlink channel.

15. The receiver of claim 13, wherein the pilot channel is a common pilot channel (CPICH) of a WCDMA system and the desired channel is a high-speed physical downlink shared channel (HS-PDSCH) of a WCDMA system.

16. The receiver of claim 13, wherein the SIR estimator is further configured to form successive signal-to-interference terms and to filter the successive signal-to-interference terms to obtain the signal-to-interference metric.

* * * * *